R. McNULTY.
Car-Truck.

No. 167,405.

Patented Sept. 7, 1875.

Witnesses:
John E. Bauman
Lewis Holmes

Inventor:
Richard McNulty

UNITED STATES PATENT OFFICE.

RICHARD McNULTY, OF NASHVILLE, TENNESSEE.

IMPROVEMENT IN CAR-TRUCKS.

Specification forming part of Letters Patent No. 167,405, dated September 7, 1875; application filed March 5, 1875.

CASE B.

*To all whom it may concern:*

Be it known that I, RICHARD MCNULTY, of Nashville, in the county of Davidson, State of Tennessee, have invented a certain new and useful Improvement in Railway-Car Trucks, of which the following is a description and specification:

My invention consists in the manner of supporting the body of the car proper on the truck by and through the medium of a system of nests of elliptical springs under the center-pin bolster-frame of the truck.

Figure 1:
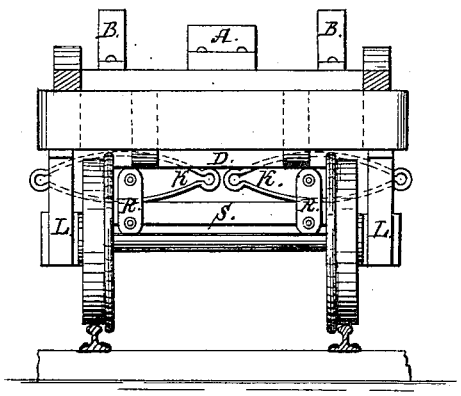
Figure 2:
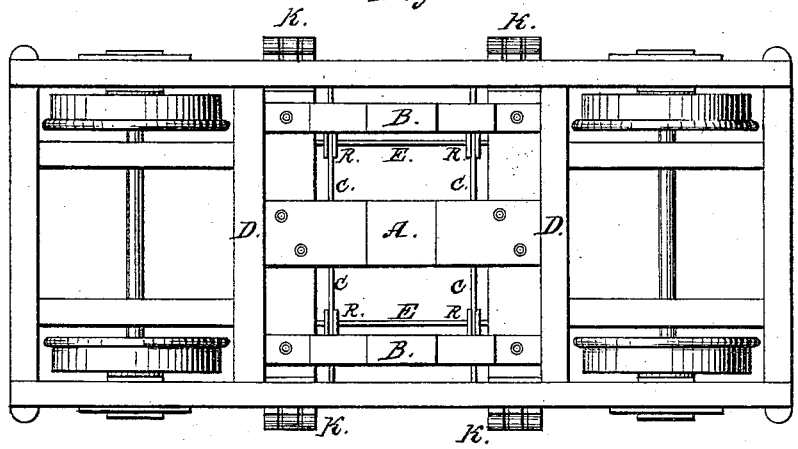
Figure 3:
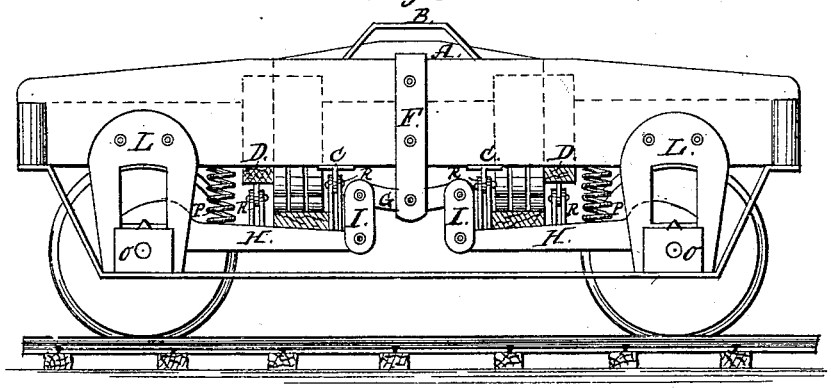

Figure 1 is an end view of the truck, showing the arrangement of the elliptical springs K K, bolster-block A, rubber bolsters B B, and straps R R, which support the pieces S S, on which the elliptical springs rest. Fig. 2 is a top view of said truck, showing the arrangement and combination of the different parts as enumerated in Fig. 1. Fig. 3 is a side view of the truck, showing this arrangement and combination of the different parts enumerated in Fig. 1.

Like parts are designated by same letters in all the views.

I construct the body of the frame of the truck in the ordinary manner, and then place rigidly across the frame of the truck two pieces of timber, D D, framed in the body of the truck, and also fasten firmly to the bottom edge of the side pieces of the truck-frame two iron or metallic cross-pieces, C C, which iron pieces C C and the wooden pieces D D are jointly used to suspend and hold in position the straps R R, which support the pieces S S, on which are placed and rest the four elliptical springs K K K K, which support the center bolster-frame, which carries the bolster-block A and the rubber bolsters B B, and on these the body of the car is placed and carried in the usual manner.

I am well aware that elliptical springs have been heretofore used in the construction of six-wheeled trucks; but in the construction of four-wheeled trucks heretofore there has never been used more than two sets or nests of springs, whereas by my arrangement I am enabled to use and utilize four nests of springs in a four-wheel truck, by which arrangement and combination I make an easier, better, and steadier riding motion.

Having thus fully described the manner of constructing and operating my invention, I do not claim the device for supporting the framing of the body of the truck on the wheels and axles of the same by and through the medium of springs, spring-levers, equalizing-levers, and stirrups, which is shown in the drawings, as this device and combination forms the subject of another application for a patent.

I claim as my invention—

The combination of a four-wheeled truck, center bolster-frame, elliptical springs K K K K, supports C C and D D, straps R R, and supporting-pieces S S, all substantially as and for the purpose set forth.

RICHARD McNULTY.

Witnesses:
 JOHN E. BAUMAN,
 D. N. NOYLAN.